Figure 1:
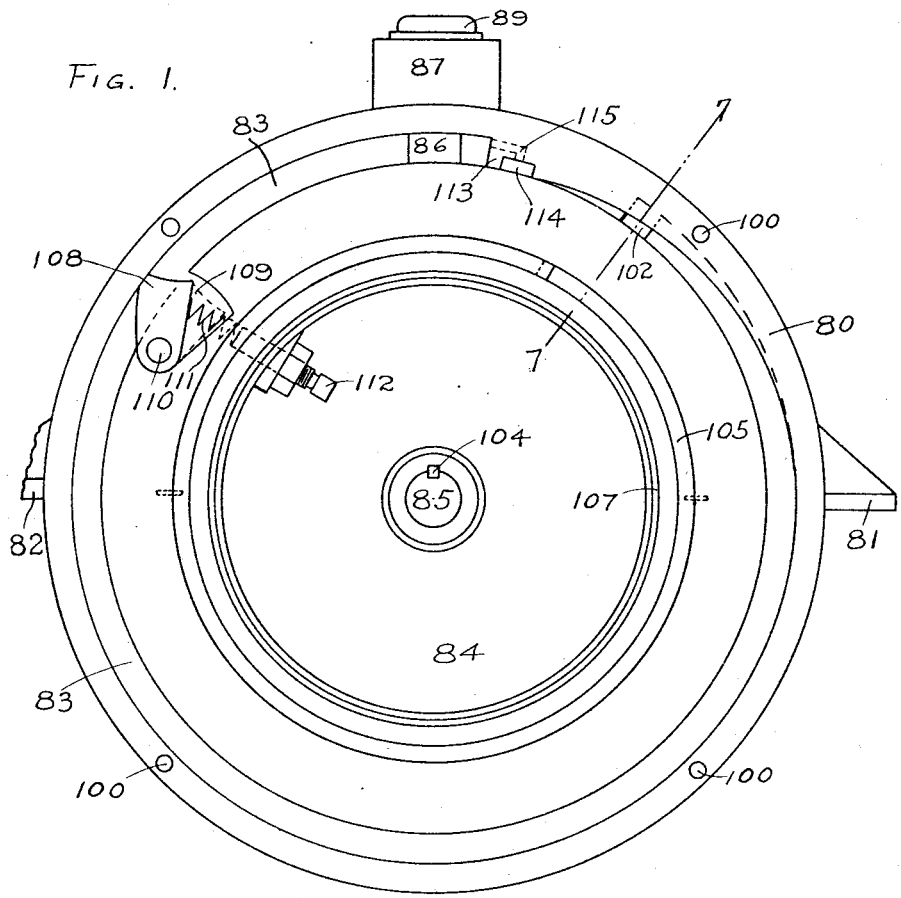

H. L. BOYLE.
ROTARY MOTOR.
APPLICATION FILED MAY 1, 1909.

1,181,638.

Patented May 2, 1916.
4 SHEETS—SHEET 1.

WITNESSES:

INVENTOR.
H. L. Boyle
BY
ATTORNEYS.

H. L. BOYLE.
ROTARY MOTOR.
APPLICATION FILED MAY 1, 1909.
1,181,638.
Patented May 2, 1916.
4 SHEETS—SHEET 2.
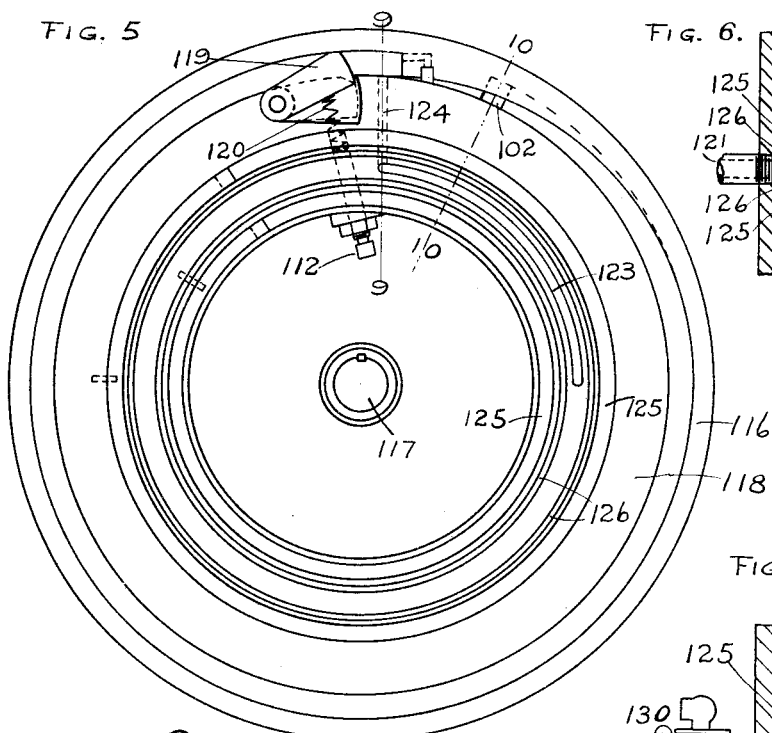
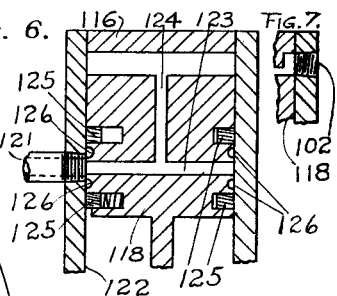
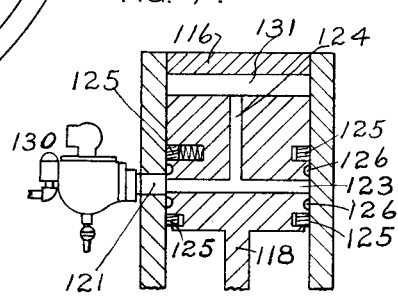
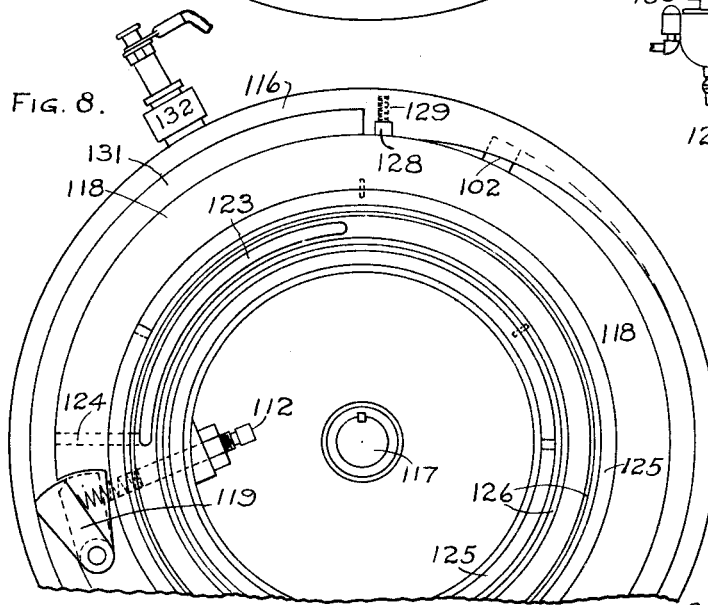

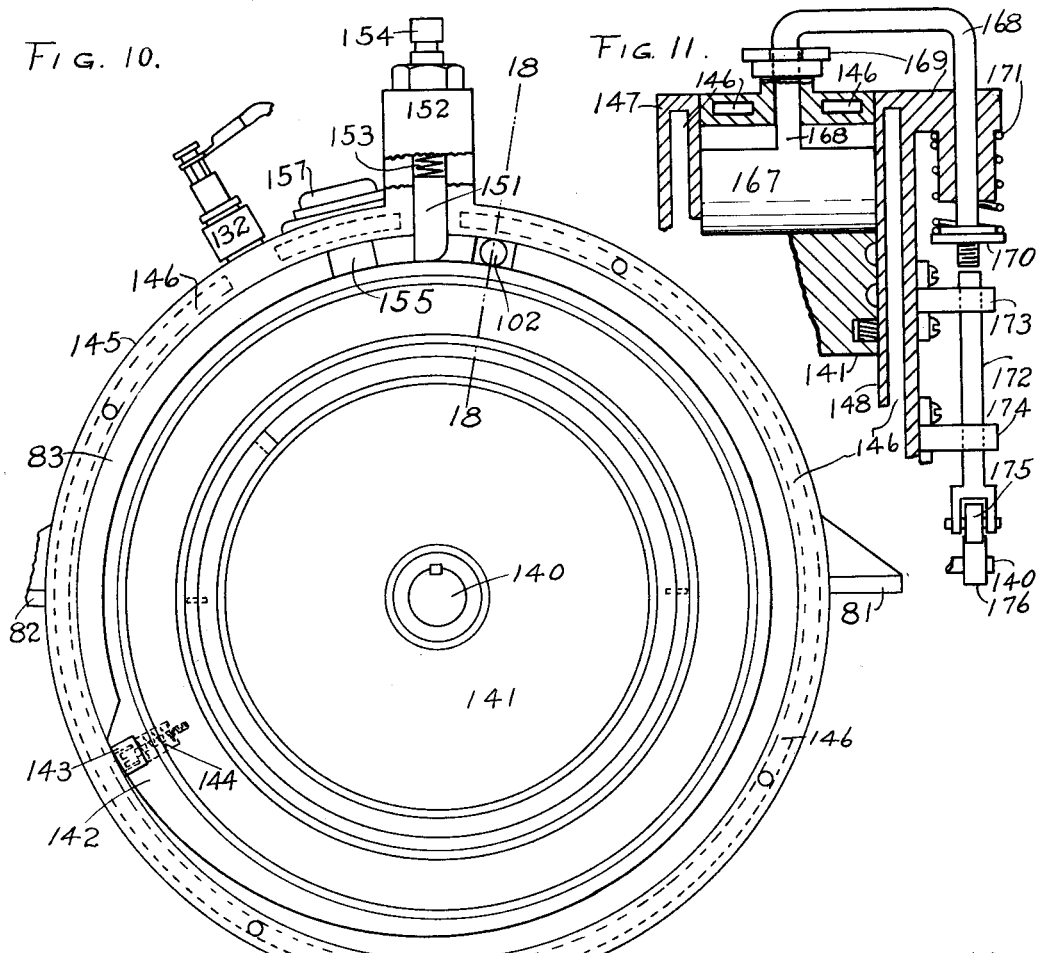

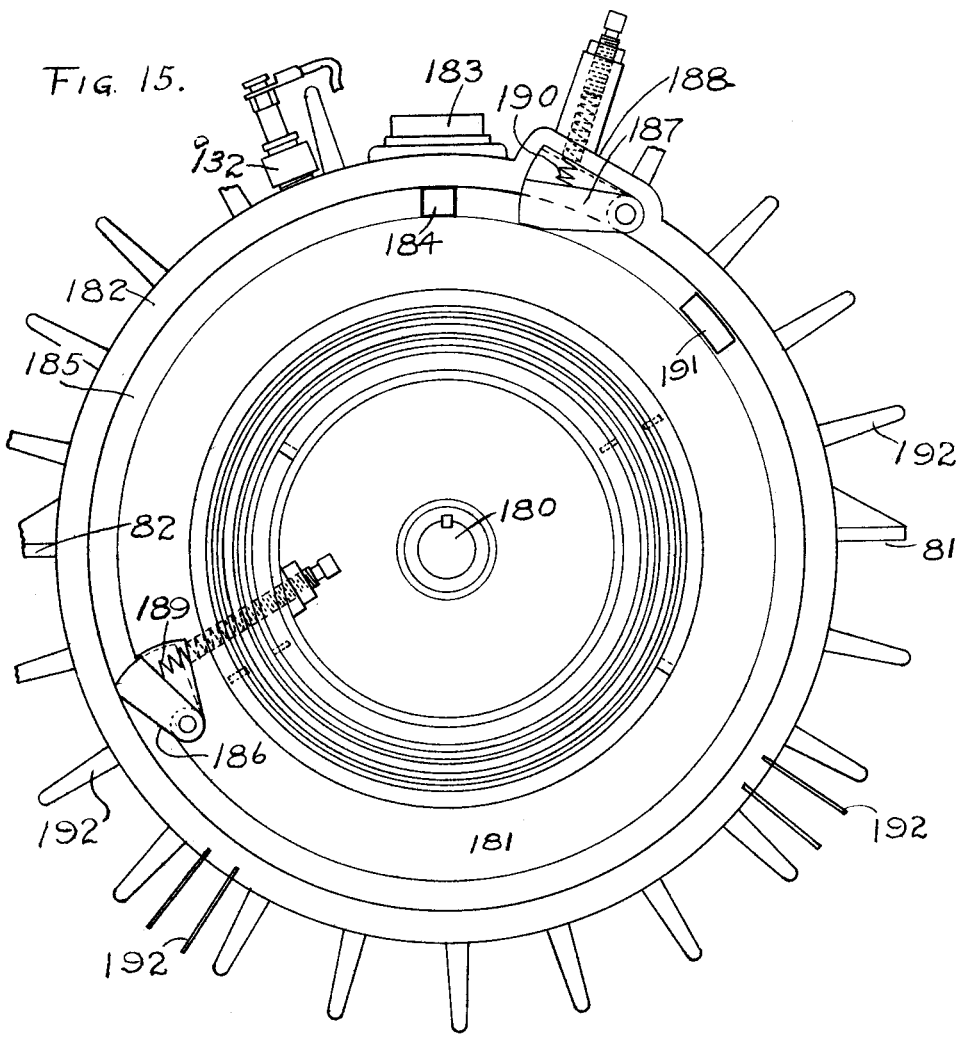

UNITED STATES PATENT OFFICE.

HOMER L. BOYLE, OF LANSING, MICHIGAN, ASSIGNOR OF ONE-FOURTH TO WILLIAM E. CROTTY, OF LANSING, MICHIGAN, AND ONE-TENTH TO JESSE C. NARMORE, OF LANSING, MICHIGAN.

ROTARY MOTOR.

1,181,638.     Specification of Letters Patent.     Patented May 2, 1916.

Application filed May 1, 1909. Serial No. 493,378.

*To all whom it may concern:*

Be it known that I, HOMER L. BOYLE, a citizen of the United States, residing at Lansing, in the county of Ingham and State of Michigan, have invented certain new and useful Improvements in Rotary Motors, of which the following is a full, clear, and exact specification.

This invention relates to rotary motors, and more particularly to rotary motors for driving road vehicles, as automobiles.

The primary object of the invention is to provide improved means in rotary motors for dispensing with all reciprocating motion, and the attendant vibration and wear incident thereto.

The invention has for a further object the provision of improved means for adapting a rotary motor to be driven by explosive and expansible gases.

To the attainment of these ends and the accomplishment of certain other new and useful objects, the invention consists in the features of novelty hereinafter described and shown in the drawings forming a part of this specification, and finally pointed out more specifically in the appended claims.

Figure 2:
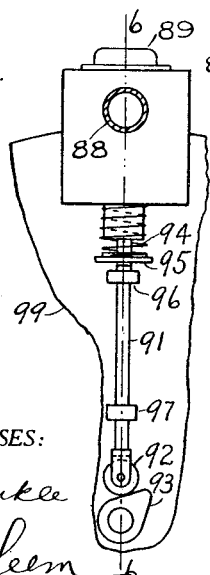
Figure 3:
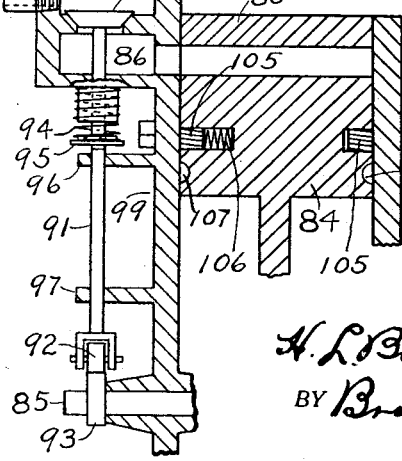
Figure 4:
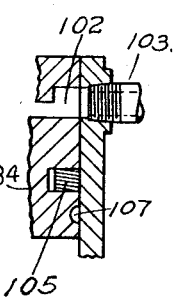

In the said drawings—Figure 1 is a side elevation of the motor with one side of the casing removed, showing the interior thereof. Fig. 2 is a fragmentary view of the reverse side of the motor in Fig. 1, showing the steam chest which contains the valve controlling the intake port. Fig. 3 is a sectional view on line 6—6 of Fig. 2. Fig. 4 is a detail view of the exhaust outlet in the casing and a fragment of the rotary wheel, the same being taken on line 7—7 of Fig. 1. Fig. 5 is a view similar to Fig. 1, showing a modified form of my rotary motor with one side of the casing removed, and showing also means for the operation of the motor without the use of mechanically operated valves. Fig. 6 is a detail sectional view showing the casing and rotary piston, the same being taken on line 9—9 of Fig. 5. Fig. 7 is a detail view in section on line 10—10 of Fig. 5, illustrating the construction of the parts adjacent the exhaust port. Fig. 8 is a side elevation of a modified form of my improved rotary motor adapted to use explosive gases instead of steam. Fig. 9 is a detail sectional view similar to Fig. 6 showing the manner of attachment of a carbureter to the inlet port when it is desired to use explosive gases to be generated from oils in driving the motor. Fig. 10 is a view similar to Fig. 8, showing a modified form of rotary piston and the motor being provided with a water-jacketed casing. Fig. 11 is a sectional view through the casing shown in Fig. 10, and illustrates a form of closure member mechanically operated from the main drive shaft. Fig. 12 is a fragmentary view of the rear of the engine in Fig. 10, showing a form of mechanically operated intake valve. Fig. 13 is a detail sectional view on line 17—17 of Fig. 12. Fig. 14 is a sectional view taken on line 18—18 of Fig. 10, showing the construction of the parts adjacent the exhaust port. Fig. 15 is a view similar to Fig. 10, showing a modified form of closure member, the same being pivoted in the casing and spring operated. In this view the casing of the motor is also shown provided with heat radiating means.

In Fig. 1 is shown a side view of the motor with one of the outer covers removed to disclose the interior construction. The circular casing of the rotary motor is indicated by the reference character 80, and may be provided with suitable means as indicated at 81 and 82, preferably cast integrally with the casing 80 for supporting the motor on the frame of the vehicle, or other means on which it may be desired to mount the motor. 83 is the chamber on the interior of the motor casing 80 in which the piston or disk 84 is rotatably mounted on the main shaft 85 of the motor. The chamber 83 within the casing 80 is concentric excepting for a short distance of its internal periphery adjacent the exhaust and intake ports. The intake port is indicated at 86 leading from the steam chest 87 formed on the casing 80 to the interior of the steam chamber 83. The pipe leading from the generator or boiler for conveying the steam to the chest 87 is indicated in Figs. 5 and 6 by the reference character 88. 89 is a screw-threaded plug for closing the steam chest 87, and is removable, in order that access may be had to the interior of the chest for the purpose of repairing or adjusting the valve 90 which controls the opening to the intake port 86 of the motor. The valve 90 situated at the entrance to the intake port 86 is controlled by the valve stem 91, provided at its lower end with antifriction roller 92 engaging with eccentric cam 93 secured to the end of the main shaft 85 of the motor. The intake valve 90 is normally held closed by means of the expansive coil spring 94 interposed between the wall of the motor and a suitable member 95 secured to valve stem 91. The valve stem 91 is held in position to be reciprocated from the cam 93 on the main driving shaft by means of suitable extensions 96, 97 cast integral with the casing of the motor. The peripheral member of the casing 80 has secured to its sides suitable closure plates, the one on the front of the motor, which does not appear in Fig. 1, but is shown in section in Fig. 3, is indicated by the reference numeral 98, and the plate on the rear side of the motor as it appears in Fig. 1 is indicated by the reference character 99, Figs. 2 and 3. The side plates 98, 99 of the motor casing may be secured to the circular body portion 80 by passing suitable threaded bolts through holes 100 in the circular member 80 of the casing, and passing also through holes in plates 98, 99, registering with the holes 100 in the member 80 of the casing. The nuts on the ends of such threaded bolts appear in Fig. 3 of the drawing, and are indicated by the reference character 101. The exhaust port 102 of the motor is formed in the rear wall of the casing, as shown most clearly in sectional view of Fig. 4, and the exhaust is led off through this port by any suitable means, as by the threaded pipe 103. The rotary disk or piston 84 is preferably of the form shown most clearly in Fig. 3, having an outer peripheral portion completely filling the space between the side walls of the casing and said outer peripheral portion being connected by a thinner inner disk formed integral with the outer peripheral portion and provided with a hub portion at the center adapted to be journaled on the main shaft 85, being secured thereto by suitable means, as a key 104 coöperating with suitable matched grooves in the shaft and the hub of the piston. In order that the outer or peripheral portion of the piston 84 may be furnished a comparatively steam-tight joint with the walls of the casing, it is provided with a circular groove on each of its lateral edges and into these grooves on each side of the piston suitable metallic rings as indicated at 105 are inserted. These rings may be forced outwardly into contact with the side plates 98, 99 of the casing to form steam-tight joints by means of suitable elastic means, as the springs 106 shown in Fig. 3. In order to furnish suitable means for carrying lubricating oils or other lubricating material, the sides of the peripheral portion of the piston is provided with one or more concentric grooves as indicated at 107. It will be noted that the diameter of the rotary piston 84 is somewhat less than the interior diameter of the casing, thereby forming the chamber 83. The piston 84 is provided with a pivoted closure member 108 adapted to spring outwardly in contact with the inner wall of the casing 80, being seated in a suitable recess 109 in the periphery of the piston, and secured to a suitable pivot pin 110. This closure member 108 is normally held outward and against the casing by a suitable spring 111, which has one end interposed against the closure member 108 and the other end controlled by a suitable adjusting screw 112, which is threaded in the rotary piston. The steam chamber 83 formed between the outer periphery of the rotary piston and the wall of the casing is uniform except where the interior diameter of the member 80 of the casing is contracted adjacent the intake port 86, as indicated at 113. The wall of the member 80 of the casing is drawn inwardly at an incline until at 113, which is adjacent the steam port, the outer periphery of the rotary piston and the part 113 are so close together as to form a steam-tight joint. But in order that this steam-tight joint may be formed with as little friction as possible, it is preferred that a recess be formed in the outer wall of the casing in the depressed part 113 and into this recess a suitable movable block or closing member be inserted, as indicated at 114. The block 114 being on the upper side of the motor, may be held by gravity upon the periphery of the rotary piston, or it may be held in contact with the piston by a suitable elastic means interposed between it and the casing. The preferred manner, however, of keeping the closure member 114 in contact with the periphery of the rotary piston is to provide a duct as indicated at 115, leading from the intake port 86 and opening above the block 114, whereby the pressure of the steam upon the closure member 114 will keep it in contact with the periphery of the rotary piston, thus forming a steam-tight joint and preventing back pressure into the exhaust portion of the steam chamber, and so preventing a decrease in the power of the motor.

In the operation of the rotary motor of the form illustrated in Figs. 1 to 4 inclusive, the steam from the chest 87 enters the steam chamber 83 behind the closure member 108 through the intake port 86, being admitted thereto by the valve 90, which is controlled by the main drive shaft of the motor. With the piston in position as shown in Fig. 1, the steam on passing the port 86 enters the chamber 83 behind the closure member 108, which confines it within the chamber and between the closure member and the intake port. The contracted part of the outer casing 113, together with the closure member 114 carried by the outer casing assists in forming a steam-tight connection between the periphery of the rotary piston and the casing wall, thus confining the steam within that portion of the chamber 83 between the intake port and the pivoted closure member 108 on the piston. The expansive force of the steam will then be exerted to move the piston and the closure member 108 carried thereby on the driving shaft 85, and the closure member 108 will be carried around until it passes the exhaust port at 102. It is preferred, however, and found most desirable in practice to work the steam expansively that is, the steam from the pressure supply is not allowed to escape through the intake port into the chamber of the casing except for a fraction of the revolution of the piston after the pivoted closure member 108 passes the intake port. The character and position of the cam 93 operating the valve stem 91 and the valve 90 is preferably such that the intake port is open only approximately one-quarter of a revolution of the rotary piston, or, in other words, when the closure member 108 has passed beyond the intake port 86 approximately ninety degrees or a quarter of a revolution, the intake port is closed and the remainder of the rotation of the piston is accomplished by the expansive force of the steam within the chamber. When the closure member passes the exhaust port 102, the steam confined within the chamber behind the closure member is allowed to exhaust, and should there be steam remaining within the chamber behind the closure member 108, the same will be forced out through the exhaust opening 102 before the closure member 108 on the succeeding revolution of the piston.

Figs. 5, 6 and 7 show a modified form of the rotary motor adapted to work automatically in opening and closing the intake and exhaust ports, thus dispensing with the use of reciprocating or mechanically operated valves, cams, springs and the like. In this modification of the invention the peripheral member of the outer casing is indicated by the reference character 116, the main driving shaft by 117, and the rotary piston of the general form heretofore described is indicated by 118. The rotary piston 118 is provided with a pivoted closure member 119 controlled by a suitable adjustable spring 120. In this modification of the invention the intake port is indicated at the threaded end of the pipe 121 entering the rear wall 122 of the casing. The enlarged peripheral portion of the rotary piston 118 is provided with a curved slot as indicated at 123, said slot extending from side to side through the peripheral portion of the piston and being curved so that it is concentric with the peripheral edge of the piston. This slot preferably extends for a distance equal to about ninety degrees of the circumference of the piston, and at its forward extremity it is provided with a branch 124 which extends laterally outward from the center to the outer periphery of the piston. In this modification of the invention the mechanically operated intake valve is dispensed with, the steam entering the curved passage way 123 in the piston as soon as the forward end of the curved slot registers with the intake port 121. The branch opening extending from the curved slot 123 to the outer periphery of the piston, as indicated at 124, conveys the steam into the pressure chamber behind the pivoted closure member 119. The steam thus admitted to the pressure chamber, the operation is the same as in the form indicated in Figs. 1 to 4 inclusive already described, except that in the present form of the invention the steam is constantly admitted to the motor as long as the curved slot 122 is in register with the intake port, but it will be apparent that as soon as the rear extremity of the curved slot 122 has passed the intake port, the steam will be cut off and the piston will be propelled for the remainder of its revolution by the expansive effect of the steam confined behind the closure member 119. The exhaust port 102 is situated the same as the similar port in the form shown in Fig. 1. In the modification of the invention as illustrated in Figs. 5 and 6, the piston is provided with rings 125 placed in recesses extending around the sides of the piston. There may be one or more of such rings, but as shown in Figs. 5 and 6, there are two on each side, and they are located so that they serve to confine the steam within the curved slot 123, which receives the steam from the intake port and transmits it to the pressure chamber between the periphery of the piston and the outer casing. The sides of the piston are also provided with the concentric grooves 126, one on each side of the curved slot 123. These grooves are adapted to receive and retain lubricating oil.

In Figs. 8 and 9 a modified form of the invention is shown, in which the rotary motor is adapted to be driven by explosive gases, as natural gas, or the gases generated from gasolene, crude oils and the like. In this modification of the invention the outer casing 116 is substantially the same as shown in Fig. 5, and the same form of rotary piston 118 is employed. The exhaust port 102 in the casing is the same as in the form shown in Fig. 5, as is likewise the depressed portion of the outer casing adjacent the exhaust and intake ports, except that a modified form of closure member in the outer casing for coöperating with the periphery of the piston is shown, and which consists of a member 128 movably mounted in a suitable slot in the depressed portion of the outer casing, and held in constant engagement with the periphery of the piston by a suitable spring 129. The piston 118 is the same as shown in Figs. 5 and 6, being of a type adapted to dispense with a mechanically operated intake valve. In Fig. 9, which is a view similar to Fig. 6, the carbureter is shown attached to the intake valve and is indicated by the reference character 130. It is found that when the engine is once started, the action of the rotary piston is to draw in through the intake port a charge of whatever material may be used for supplying the motive power. When gas is used, the carbureter will be unnecessary, but when volatile oils are the source from which the explosive is made, the carbureter is necessary, and the details of the same are not set forth, as a carbureter of any desired and suitable construction may be used. In the modification of the invention shown in Figs. 8 and 9, the explosion chamber is indicated at 131, and in communication with this chamber is suitable means, as indicated by the spark plug 132 for firing the charge in the chamber 131. The details of this spark plug are not set forth, as a plug of any desired and suitable construction may be employed in order to furnish the desired spark for the ignition of the explosive within the chamber.

As heretofore stated, the rotation of the piston is sufficient to produce a suction through the intake port 121, thus drawing the charge from the source of fuel supply, whether a carbureter or a gas reservoir.

In Fig. 10, further modifications of the invention as particularly applied to rotary explosive motors are shown. In this modification of the invention the motor casing is also shown provided with means for affording a water circulation in order to cool the motor. In order to accomplish this purpose, the casing is shown provided with water jacketed sides, that is, the side walls of the motor and the outer peripheral wall are provided with intercommunicating passages through which water is allowed to flow, or a circulation of water or other suitable cooling fluid may be induced by means of a force pump. Other modifications of the invention are also shown in the drawings, included in Figs. 10 to 15 inclusive. In Fig. 10 the main driving shaft of the motor is indicated by the reference numeral 140, and secured to rotate therewith is a rotary piston 141. In this modification of the invention the piston is not concentric, but is provided with an eccentric portion, as indicated at 142, which portion projects beyond the common periphery of the piston and distends almost sufficiently to close the opening between the periphery of the piston and the circumferential wall of the casing. Within this projecting portion 142 a suitable spring controlled closure member 143 is mounted in a recess, and is normally held outwardly in engagement with the peripheral wall of the casing by a spring 144 interposed between the closure member and the piston. 145 is the peripheral wall of the casing and 146 are the intercommunicating water passages therein. The side walls of the casing, as indicated by the reference characters 147, 148, in Fig. 11 and at 149 and 150, in Figs. 13 and 14, are also provided with passages 146 in communication with the water cooling system. When the rotating piston 141 is formed with the eccentric portion 142, a spring controlled closure member 151 is provided at the top of the casing, as shown in Fig. 10, the same being contained in a suitable housing 152, and held normally in contact with the peripheral surface of the piston 141 by suitable elastic means, as a coil spring 153, the tension of which is made adjustable by means of the screw 154, which is threaded into the top of the housing 152, and the lower end of which bears against the upper end of the spring 153. In this modification of the invention, as in the preferred form shown in Fig. 8, the explosive charge within the cylinder is ignited by the spark plug 132, which may be of any desired and suitable construction. The details of this spark plug, and the wiring connections of the same with the motor are not set forth in detail, as they form no part of the present invention. In the modification of the invention shown in Figs. 10 to 14 inclusive, the intake port is indicated by the reference character 155. 156 is a small chamber formed adjacent to and communicating with the intake port 155, and it is closed by the threaded cap 157, which may be removed to afford access to the intake valve 158, which is situated at the lower side of chamber 156, and is carried on valve stem 159, extending downwardly through suitable projections 160, 161, preferably formed integral with the side 149 of the casing. The valve stem 159 carries at its lower extremity a suitable anti-friction roller 162, engaging a suitable eccentric cam 163 secured to the main drive shaft 140 of the motor. The valve 158 thus controlled by the rotation of the main shaft of the motor operates to open and close the opening between the intake port and the chamber 164, which is in communication through the opening 165 with the fuel supply. The valve 158 is normally held closed by suitable elastic means, as the spring 166 interposed between the valve stem 159 and the casing.

The operation of the form of motors shown in Figs. 10 to 14 inclusive does not differ in principle from the preferred forms already described in Figs. 1 to 8 inclusive. The fuel charge is drawn to the intake port 155 by the suction produced by the motor, and when the rotation of the piston 141 has carried the elastically controlled closure member to a predetermined point beyond the intake port 155, the chamber behind the closure member 143 will be filled with the proper mixture of explosive drawn through the intake port, and the charge will be fired by the spark plug 132. At the time of the ignition of the charge the intake valve 158 will have closed and the charge will be confined in the chamber 83 behind the portion of the piston contacting with the outer wall of the casing. The spring controlled closure member 151 in the housing 152 of the casing confines the expansive effect of the charge within the explosive chamber, so that the force of the charge is exerted to rotate the piston 141, and the expansion of the gases within the chamber 83 will be effective to move the piston until the eccentric portion 142 and the closure member 143 on the piston pass the exhaust port 102. When the eccentric portion 142 of the piston passes under the closure member 151 in the casing, this member being slidably mounted, will be elevated to accommodate the enlarged portion of the piston, and such movement will compress the spring 153, which will cause the return of the closure member after the enlargement on the piston has passed from under it. In Fig. 11 a modification of the closure member 151 is shown, the same being indicated by the reference character 167, and provided with an upwardly extending branch 168 passing through a suitable stuffing box 169. The branch 168, after passing through and beyond the casing, is formed at a right angle outwardly, and thence at a right angle downwardly on the exterior of the casing, and passes through a suitable support 169 on the casing. The lower extremity of the member 168 is shown threaded and provided with a suitable washer 170, between which and the supporting branch 169 of the casing a coil spring 171 is interposed for normally holding the closure member 167 in contact with the periphery of the piston. In order that the closure member 167 may be mechanically operated, the shaft 172 is mounted for longitudinal movement on the side of the casing in suitable supporting brackets 173, 174, with its upper end in contact with the lower extremity of the U-shaped branch 168 of the closure member. At its lower extremity the shaft 172 is provided with an anti-friction roller 175, which is in contact with and operated by eccentric cam 176 on the main shaft 140 of the motor.

In Fig. 15, a still further modification of the motor is shown, the main driving shaft being indicated by the reference character 180, and suitably secured to the concentric piston 181. The casing 182 is shown provided with the usual intake chamber 183, from which the intake port 184 leads, to the explosion chamber 185 formed between the outer periphery of the piston and the wall of the casing and bounded by the pivoted closure member 186 on the piston and the pivoted closure member 187 contained in the housing 188 in the casing. 189 is a suitable adjustable spring controlling the pivoted closure member 186, while the pivoted member 187 in the casing is likewise controlled by the adjustable spring 190. The exhaust port is indicated by the reference numeral 191, and the spark plug 132 is screw-threaded into the casing, as in Fig. 10. The casing in this modification of the invention is shown provided with suitable projecting members 192 which serve as radiating means for conducting the heat generated in the motor by the explosions to the surrounding atmosphere. These heat radiating means in Fig. 11 are designed under some conditions to take the place of the water-jacketed casing, thus producing an air-cooled rotary motor.

In order that the invention may be fully understood, the details of the preferred embodiment of the invention have been thus specifically described, and it will be apparent that many modifications may be made by those skilled in the art without departing from the purpose and spirit of the invention, but

What I claim is:

1. A rotary motor comprising a casing inclosing a substantially cylindrical chamber with parallel end walls, there being an intake opening in one of said walls; a rotary piston mounted in said chamber with its ends fitting against said end walls and of a diameter smaller than said chamber providing a substantially annular space around the piston, there being an arcuate slot through the piston adapted to register with said intake port and a radial perforation extending from said radial slot to said annular space; means operable by the piston for controlling the entrance of fluid to the cylinder; a radial projection on the inside of said casing engaging said piston, there being an exhaust port in one of said ends near said projection and opening from said annular space; and a pivotally mounted vane on said piston and engaging the periphery of the chamber.

2. A rotary member comprising a casing inclosing a cylindrical chamber having intake and exhaust ports; a rotary piston mounted in said chamber, there being a substantially annular space between the peripheries of said chamber and said piston; an extension in said casing extending from the periphery of said chamber and engaging said piston; and a packing member slidably mounted in said extension and riding on the periphery of the piston, there being a perforation in said projection opening against said packing member at the side thereof opposite the piston and affording a passage for a fluid under pressure to permit the latter to press the packing member against the piston.

In testimony whereof I have signed my name to this specification, in the presence of two subscribing witnesses, on this 27th day of April, A. D. 1909.

HOMER L. BOYLE.

Witnesses:
CHAS. W. NICHOLS,
CLARA B. CUMMINS.

Copies of this patent may be obtained for five cents each, by addressing the "Commissioner of Patents, Washington, D. C."